Figure 1:
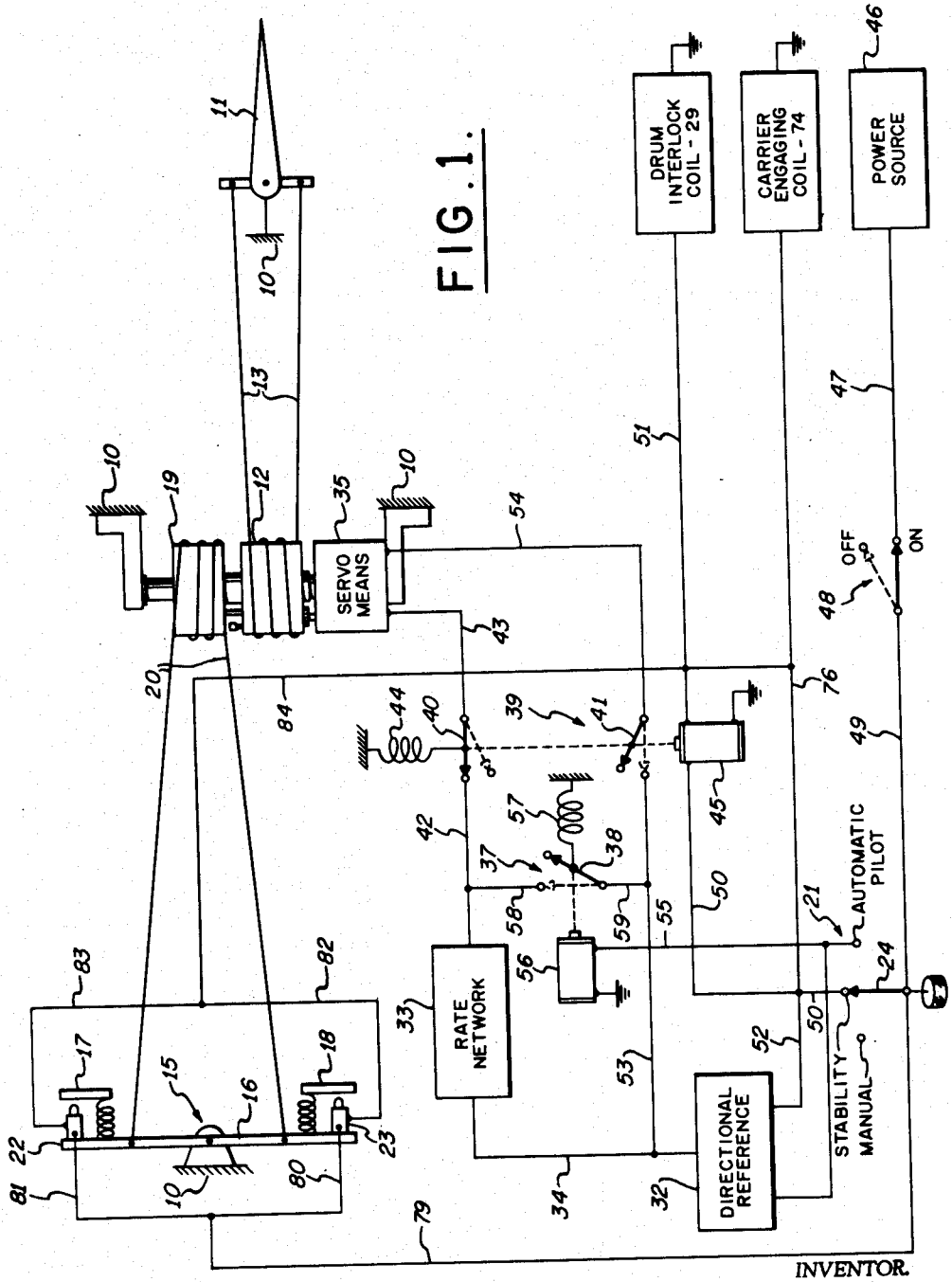

July 14, 1964  R. H. PETTIT  3,140,843
SERVO SYSTEM
Filed Sept. 6, 1962  2 Sheets-Sheet 1

INVENTOR.
ROBERT H. PETTIT
BY Arthur H. Sewell
ATTORNEY

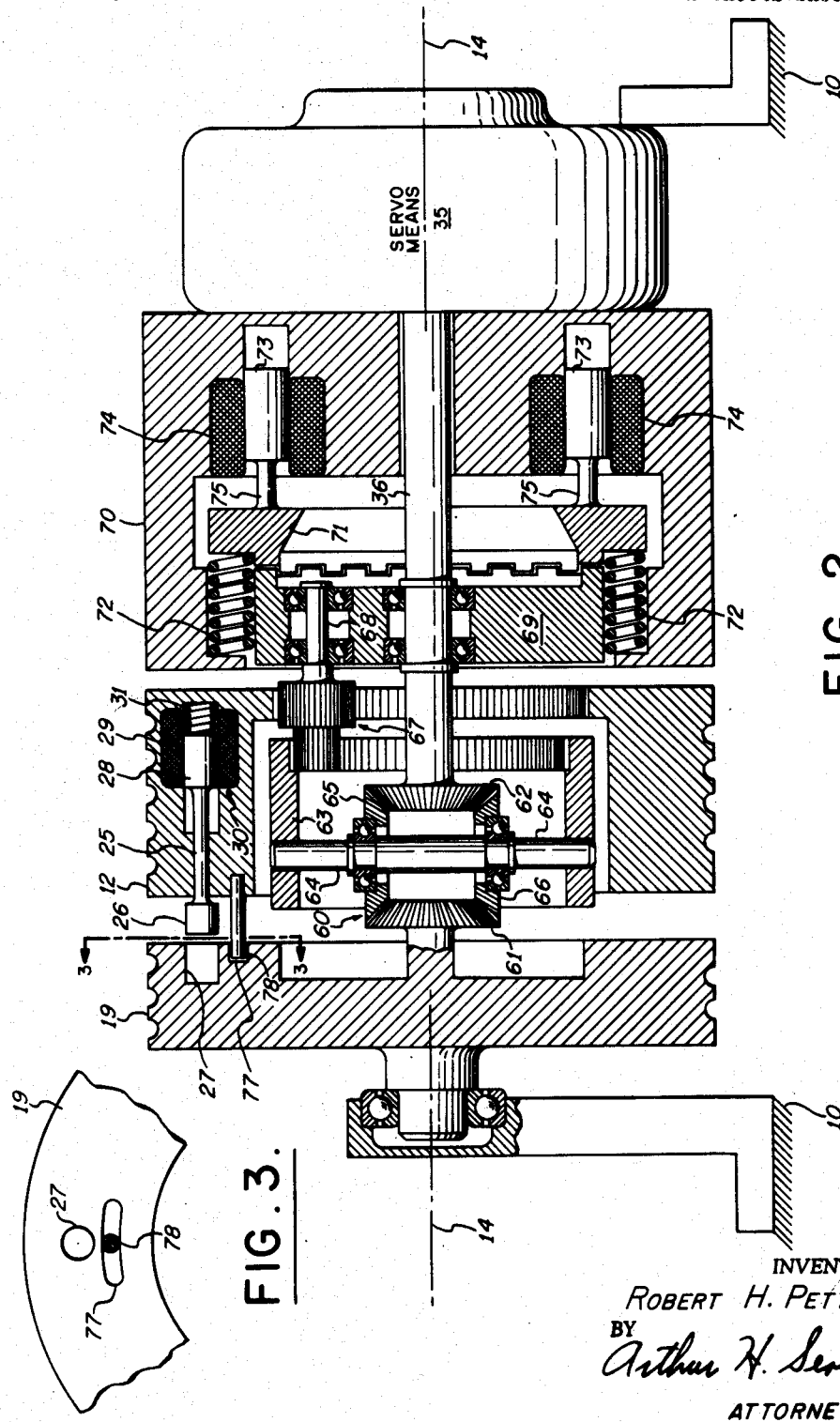

United States Patent Office 3,140,843
Patented July 14, 1964

3,140,843
SERVO SYSTEM
Robert H. Pettit, Huntington, N.Y., assignor to Sperry Rand Corporation, Great Neck, N.Y., a corporation of Delaware
Filed Sept. 6, 1962, Ser. No. 221,725
11 Claims. (Cl. 244—77)

This invention relates to a servo system of the character in which both manual and automatic inputs combine to provide an output operable to move a dirigible craft about an axis. In the improved system represented in the drawings, the craft is an aircraft with a control surface or rudder operable to control the craft about its yaw axis.

The output member or drum of the improved system moves about an axis and is operatively connected to the control surface of the craft. A manually operable controller provides one of the inputs to the output member through a rotatable member or second drum operatively connected thereto that is arranged in coaxial juxtaposed relation to the output drum or member. The other of the inputs is provided by an automatic pilot including servo means having an output depending on the movement of the craft about an axis corresponding to the axis of the control surface or rudder.

The improved system further includes differential means connecting the controller input member or drum and the servo means of the automatic pilot in the combination in equal input relation. A further connection is provided between the output element of the included differential means and the output member of the system with means for transmitting the output motion of the differential means having an input-output ratio of one to two. The arrangement provided maintains the proper coordination between the sense and extent of the motion of the output member and the respective inputs to the differential from the manual controller and the servo means.

The improved system is operable in manual, stability or semi-automatic, and automatic modes, and includes conditioning means for determining its mode of operation. In the automatic mode of operation, the included manual controller is operable to overpower the automatic pilot input. In the stability mode of operation, the system combines a manual input and an input from the servo means of the automatic pilot that is dependent on the rate of turn of the craft as it moves about its axis under the command of the human pilot. Operation of the control surface in the manual mode through the manual controller is reserved for conditions of safety to enable the craft to be maneuvered in the event of failure of the system.

A carrier is provided for the transmitting connection between the differential output element and the output member or drum that is mounted with freedom about an axis. Means are also included in the improved system for engaging the carrier in stationary condition with respect to its axis of freedom. Means are further provided for interlocking the controller member or drum of the system to the juxtaposed output member or drum. In changing from automatic to stability modes of the operation or vice versa, the system includes means for conditioning the interlocking means and carrier engaging means for alternative operation with the members or drums interlocked and the carrier freed in the automatic mode or with the carrier engaged and the members or drums freed in the stability mode.

Other novel features and structural details of the present invention will be apparent from the following description when read in relation to the accompanying drawings in which:

FIG. 1 is a combined mechanical and electrical schematic view showing the interrelated components of the improved system where the output member or drum is connected by a cable to the rudder of an aircraft, FIG. 2 is an enlarged detail sectional view taken along the common axis of the juxtaposed members or drums of the system showing the interlocking means and showing the means for engaging the motion transmitting connection of the system in stationary condition with respect to its axis of freedom, and FIG. 3 is a partial section view of the manually operable controller or drum taken on line 3—3, FIG. 2.

As shown in FIG. 1, the improved system is arranged for use in an aircraft with a fixed frame 10 and a movable control surface such as rudder 11. The output member of the system is represented as a drum 12 that is rotatably mounted with relation to the frame 10 and is suitably connected to the rudder 11 by way of cabling 13. The axis of the drum 12 is indicated at 14 in FIG. 2.

The component of the improved system providing the manually operable controller 15 is indicated in FIG. 1 as a rocker 16 pivoted to the frame 10 having opposed foot pedals 17 and 18 connected thereto by suitable springs. A rotatable member or drum 19 is operatively connected to the controller or rocker 16 through cabling 20 with the member 19 being arranged in coaxial juxtaposed relation to the output member or drum 12. The conditioning means provided in the improved system includes a mode selector electrical switch 21 and a pair of off-on electrical switches 22 and 23 located on the rocker 16, one or the other of which is closed by contact with the related pedal when the pressure exerted to compress the pedal spring by the human pilot exceeds a predetermined value. In the normal range of operation of the system in both automatic pilot and stability modes, the pressure differential exerted by the human pilot on the rocker 16 is insufficient to close either of the switches 22, 23. Under emergency conditions in the automatic pilot mode when it is necessary to overcome the input of the servo means manually, the human pilot can exert sufficient pressure on either of the pedals 17, 18 to close the related switch 22, 23 to obtain this result. As shown in FIG. 1, the mode switch 21 includes a manually adjustable blade 24 and three contact points respectively designated Manual, Stability and Automatic Pilot corresponding to the operational modes of the improved system. As shown in FIG. 1, the blade 24 of switch 21 is closed to condition the system for operation in the stability mode.

The conditioning means of the improved system further includes means for rotationally interlocking the controller member or drum 19 and the output member or drum 12. As particularly shown in FIGS. 2 and 3, such means is provided by a slide pin 25 carried by the drum 12 whose extended end 26 is arranged to engage a circular notch 27 in the juxtaposed drum or controller member 19. The opposite end of the pin 25 is provided by a cylindrical armature 28 that with fixed coil 29 forms a solenoid type actuator 30 for the drum interlocking means when the coil is electrically energized as shown in FIG. 2 with the system operating in the stability mode. In normal operation in the automatic pilot mode, a spring 31 biases the end 26 of the pin 25 into engagement with the notch to rotationally interlock the juxtaposed members 19 and 12. The solenoid actuator 30 of the arrangement shown constitutes a means for disengaging the end 26 of the interlocking pin 25 and notch 27.

In the automatic pilot mode of operation of the system, the interlocked drums or members 19 and 12 move together about axis 14 to correspondingly influence the rocker 16 and rudder 11 depending on the output of the automatic pilot. As shown in FIG. 1, the components of the automatic pilot of the improved system include a suitable directional reference 32 that may consist of a conventional directional gyro with an azimuth pickoff providing a displacement output. The automatic components shown also include a suitable rate network 33 connected to receive the displacement output of the directional reference 32 by way of lead 34. The servo means component of the automatic pilot is indicated at 35. Servo means 35 may consist of an electric motor whose rotor shaft 36 provides an output depending on movement of the craft about an axis corresponding to the axis of the surface or rudder 11. The stator housing of the indicated servo means is fixedly connected to the frame 10 of the craft. To provide both displacement and rate inputs to the servo means 35 in the automatic pilot mode and provide only a rate input in the stability mode, the system further includes a first off-on switch 37 with a single blade 38 and a second off-on switch 39 with connected blades 40 and 41. The full line positions of the blades 38, 40 and 41 indicate the respective off condition of switch 37, the closed position of blade 40 and the open position of blade 41 of switch 39 when the system is conditioned for operation in the stability mode. Here, the output of network 33 is fed to the servo means 35 by way of lead 42, the closed blade 40 and lead 43. The switch blade 40 in the arrangement shown is urged against the force of a spring 44 by energization of a solenoid actuator 45 from a power source 46, lead 47, the closed off-on switch 48, lead 49, blade 24 of mode switch 21, lead 50 to the coil of the solenoid actuator 45, and lead 51 to ground through the drum interlock coil 29. Lead 52 connects lead 50 to the directional reference 32. In this mode there is no input to the servo means 35 from the directional reference because of the open blade 41 of switch 39.

The dotted line indications of the blades 38, 40 and 41 shows the positons thereof when the system is conditioned for operation in the automatic pilot mode with the blade 24 of switch 21 moved to the automatic pilot position. Here, the reference 32 is connected to the servo means by way of lead 34, connecting lead 53, closed blade 41 of switch 39, and lead 54. The stability channel input to the means 35 from network 33 is opened by the blade 40 which under the influence of spring 44 also moves the ganged blade 41 to its dotted line position. Here, energy supplied by way of lead 55 to solenoid actuator 56 overcomes the bias of spring 57 to move the blade 38 to its closed dotted line position where it connects lead 42 to lead 53 by way of lead 58, closed blade 38 and lead 59. Both displacement and rate inputs are accordingly provided for the servo means 35 when the system is functioning in the automatic pilot mode. Here, also, the coil 29 of the means interlocking the drums 19 and 12 is unenergized so that spring 31 is effective to engage the end 26 of the pin 25 in the notch 27. With the drums 19 and 21 interlocked the shaft 36 of the servo means is directly connected thereto so that the rudder 11 and rocker 16 move in accordance with the output of the automatic pilot. When functioning in the automatic pilot mode, the drums 19, 12 interlocked by the engaged pin 25 and notch 27, move together with the respective parts of the differential 60 and the output gear 63 as the shaft 36 turns. The freed carrier 69 connected to the gear 63 turns or freewheels about the shaft 36 as the non-rotating idler 67 and non-rotating shaft 68 move with the interlocked drums 19, 12.

In the stability mode, the system is conditioned for combined manual and automatic operation with the drums or members 19 and 12 freed from engagement as shown in FIG. 2. Here, the system includes differential means for connecting the controller member or drum 19 and the shaft 36 of the servo means 35 in equal input relation represented as a mechanical differential 60 with respective one-to-one input gears 61 and 62 and an output element gear 63. As shown, gear 61 is connected to move about the axis 14 of the drum 19 in accordance with the displacement of the rocker 16 about its axis under the influence of the human pilot. The other input gear 62 of the differential is located on the end of the servo means output shaft 36 in spaced coaxial relation to gear 61. The output gear 63 also moves about axis 14 through a suitable connection to the gears 61 and 62 that includes a pin 64 arranged diametrically of axis 14 and two meshing gears 65 and 66 rotatably mounted on the pin 64.

In the improved system, the motion of output element or gear 63 of the differential means 60 is transmitted to the drum or output member 12 through a motion transmitting means including a connection with an input-output ratio of one-to-two. This connection between the components also includes a carrier that is mounted with freedom about an axis. Means are also provided for engaging the carrier of the reversing means in a stationary condition with respect to its axis of freedom. As shown in FIG. 2, the differential output gear 63 is operatively connected to the drum 12 through idler gearing 67 with an input-output ratio of one-to-two. A stub shaft 68 rotatably mounts the gearing 67 for movement about an axis parallel to the axis 14 on a carrier 69. As shown, the carrier 69 for the transmitting means is mounted with freedom about axis 14 within a carrier housing 70 that is suitably fixed to the stator of the servo means 35 and the frame 10 of the craft. The system further includes means for engaging the carrier 69 in a stationary condition with respect to its axis 14 of freedom. In FIG. 2, this means is shown in the form of a clutch plate 71 mounted in housing 70 to move along the axis 14 into cooperative engagement with the carrier 69. As represented, the cooperative end faces of the carrier 69 and clutch 71 are notched so that with the system operable in the stability mode, the engagement therebetween is such as to fix the carrier in direct relation to the frame to prevent the same from turning with the shaft 36. Accordingly, in this mode, the output of the servo means is transmitted to the drum 12 by way of shaft 36, differential input gear 62, differential output gear 63 and gearing 67. The input to the drum 12 from the manual controller 15 of the system in this mode is effected through operation of the rocker 16, cabling 20, the freed drums 19, differential input gear 61, differential output gear 63 and the gearing 67. Here, the differential means 60 combines the respective manual and automatic inputs to the output drum 12 to control the operation of the surface or rudder 11. In the carrier engaging structure shown in FIG. 2, the clutch plate 71 is moved axially into engagement with the carrier 69 against the influence of biasing means such as springs 72 by a solenoid actuator including armatures 73 and coils 74. Here, the armature 73 are connected to the plate by pins 75 and in the mode represented the coils 74 are energized from the source 46 through mode switch 21, lead 50 and a lead 76 from lead 50 through the noted coils to ground. When the mode switch 21 is thrown to condition the system for automatic pilot operation, the circuit to the coils 74 of the carrier engaging means is opened so that the clutch plate 71 under the influence of the springs 72 is moved to free the carrier 69 from engagement therewith. When so conditioned, the drum interlocking spring 31 is also effective to interlock the drum 12 to the drum 19 by moving the end 26 of the pin 25 into engagement with the notch 27.

The system operates in the automatic pilot mode with displacement and rate inputs to the servo means 35. With the drums 19 and 12 interlocked, the output shaft 36 of the servo means 35 is directly connected to the drum 19 through the differential means 60. Corresponding movement of the differential output gear 63 and related motion of the carrier 69 with the drum 12 occurs as the carrier 69 is free to move with the shaft 36 about axis 14. With respect to the drum interlocking means and carrier engaging means included in the improved system, the provided conditioning means is alternatively operable to interlock the members or drums 19 and 12 with the carrier 69 freed in the automatic pilot mode or to free the members or drums 19 and 12 with the carrier 69 engaged in the stability mode.

To limit the degree of relative movement permitted between the members or drums 19 and 12 when the system is functioning in the stability mode, stop means are included in these parts as represented in FIGS. 2 and 3 by an arcuate slot 77 in drum 19 and a fixed pin 78 on drum 12 whose end engages the arcuate slot 77 for this purpose.

To properly condition the interlocking means and carrier engaging means during operation in the automatic pilot mode when it is desired to manually overpower the servo means 35, the system includes alternative means for energizing the drum interlock coil 29 and the carrier engaging coils 74 from the source 46. As shown in FIG. 1, this means includes a lead 79 from lead 49, parallel leads 80, 81, the respective on-off switches 22, 23, parallel leads 82, 83, and common lead 84 to the input lead 51 for coil 29 and input lead 76 for coils 74. By exerting sufficient pressure on one of the pedals 17 or 18, the human pilot is able to close the related open switch 22 or 23 and energize the system so that the desired result is obtained.

In emergency manual operation of the system, the output drum 12 is moved by the drum 19 through the stop means provided by the pin 78 and slot 77.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A manual and automatic servo system for dirigible craft with a movable control surface including an output member rotatable about an axis operatively connected to the surface, a manually operable controller, a rotatable member operatively connected to the controller arranged in coaxial juxtaposed relation to the output member, means for rotationally interlocking the controller member and the output member, an automatic pilot including servo means providing an output depending on movement of the craft about an axis corresponding to the axis of the movable control surface, differential means connecting the controller member and the servo means in equal input relation having an output element; motion transmitting means including a connection between the differential output element and the output member with an input-output ratio of one to two, and a carrier for the connection mounted with freedom about an axis; means for engaging the carrier of the transmitting means in stationary condition with respect to its axis of freedom, and means for conditioning the interlocking means and carrier engaging means of the system for alternative operation with the members interlocked and the carrier freed or with the members freed and the carrier engaged.

2. A manual and automatic servo system for dirigible craft with a movable control surface including an output drum with an axis connected to move the control surface, a manually operable controller, an input drum connected to the controller arranged in coaxial juxtaposed relation to the output drum, means for rotationally interlocking the input and output drums, an automatic pilot including servo means providing an output depending on movement of the craft about an axis corresponding to the axis of the movable control surface, a mechanical differential between the controller drum and the servo means having one to one input gears and output gear; means connecting the differential output gear and the output drum including idler gearing with an input-output ratio of one to two, and a carrier for the idler gearing mounted with freedom about an axis; means for engaging the carrier in a stationary condition with respect to its axis of freedom, and means for conditioning the interlocking means and engaging means of the system for alternative operation with the drums interlocked and the carrier freed or with the drums freed and the carrier engaged.

3. In a combined manual and automatic servo system for dirigible craft with a movable control surface, an output member rotatable about an axis operatively connected to the surface, a manually operable controller, a rotatable member operatively connected to the controller, an automatic pilot including servo means providing an output depending on the turn rate of the craft about an axis corresponding to the axis of the movable control surface, differential means connecting the controller member and the servo means having a one to one input relation and an output element; motion transmitting means including a connection between the differential output element and the output member with an input-output ratio of one to two, and a carrier for the connection mounted with freedom about an axis; and means for engaging the carrier of the transmitting means in a stationary condition with respect to its axis of freedom to condition the system for combined manual and automatic operation.

4. A system of the character claimed in claim 3 in which the controller member is arranged in coaxial juxtaposed relation to the output member, including stop means on said respective members for limiting the relative angular movement therebetween.

5. A system of the character claimed in claim 3 in which the controller member is arranged in coaxial juxtaposed relation to the output member, including means for rotationally interlocking the respective juxtaposed members, and in which the conditioning means includes means for rendering said interlocking means ineffective.

6. In a combined manual and automatic servo system for dirigible craft with a movable control surface, an output drum with an axis connected to move the control surface, a manually operable controller, an input drum operatively connected to the controller arranged in coaxial juxtaposed relation to the output drum, an automatic pilot including servo means providing an output depending on the turn rate of the craft about an axis corresponding to the axis of the movable control surface, a mechanical differential between the controller drum and the servo means having one to one input gears and an output gear, means connecting the differential output gear and the output drum including idler gearing with an input-output ratio of one to two, and a carrier for the idler gearing mounted with freedom about the axis of the output drum; and means for engaging the carrier in a stationary condition with respect to its axis of freedom to condition the system for combined manual and automatic operation.

7. A system of the character claimed in claim 6 in which one of said drums includes an arcuate slot and the other of said drums includes a pin that cooperates with the ends of the slot to limit the relative angular movement between the drums.

8. A system of the character claimed in claim 6 in which one of said drums includes a notch and the other of said drums includes a slide pin that engages the notch to interlock the drums, and in which the conditioning means includes means for disengaging the interlocking pin and notch.

9. In a combined manual and automatic servo system for dirigible craft with a movable control surface, an output drum with an axis connected to move the control surface, a manually operable controller, an input drum operatively connected to the controller arranged in coaxial juxtaposed relation to the output drum, means for rotationally interlocking the juxtaposed input and output drums, and servo means for operating said interlocked drums including an automatic pilot providing an output depending on movement of the craft about an axis corresponding to the axis of the movable control surface.

10. A system of the character claimed in claim 9 including alternative means differentially connecting the input drum and servo means to the output drum, and conditioning means for rendering said interlocking means ineffective and said alternative connecting means effective.

11. A system of the character claimed in claim 10 including stop means between the respective drums for limiting the relative axial movement therebetween when the interlocking means is rendered ineffective.

References Cited in the file of this patent

UNITED STATES PATENTS

| | | |
|---|---|---|
| 1,847,088 | Halliburton | Mar. 1, 1932 |
| 1,993,549 | Holmes | Mar. 5, 1935 |
| 2,381,478 | Zukor | Aug. 7, 1945 |